Jan. 7, 1964    D. J. BLUNDEN ETAL    3,116,844
VEHICLE TRANSPORT LOADING AND UNLOADING STRUCTURE
Filed March 19, 1962    7 Sheets-Sheet 1
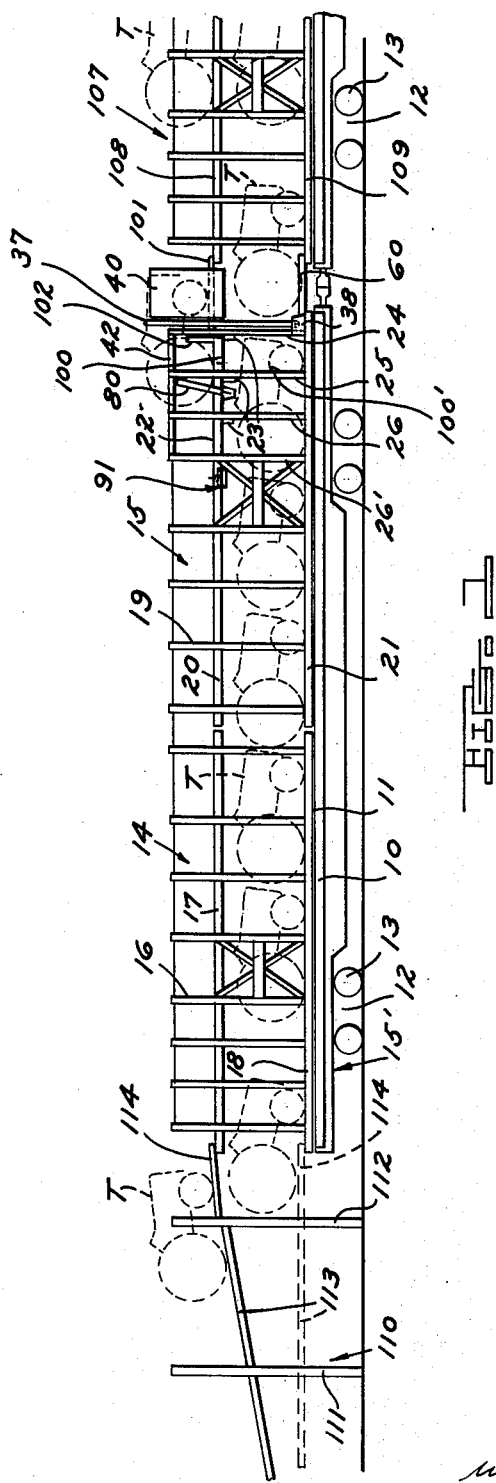
INVENTORS
DONALD J. BLUNDEN
ROBERT J. HAGGARTY
BY JAMES E. BLACK, JR.
Whittemore, Hulbert & Belknap
ATTORNEYS Jan. 7, 1964   D. J. BLUNDEN ETAL   3,116,844
VEHICLE TRANSPORT LOADING AND UNLOADING STRUCTURE
Filed March 19, 1962                    7 Sheets-Sheet 2
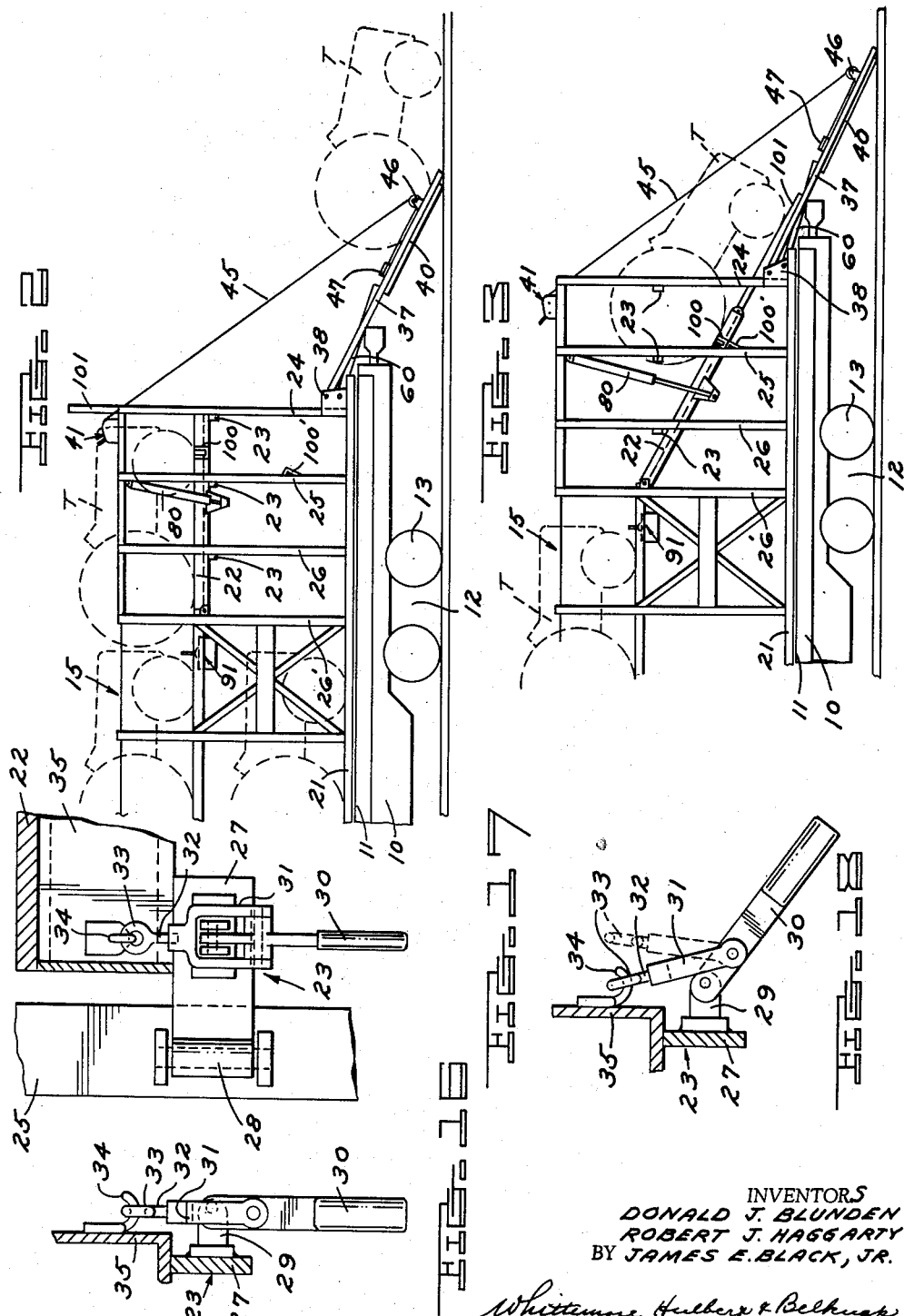
INVENTORS
DONALD J. BLUNDEN
ROBERT J. HAGGARTY
BY JAMES E. BLACK, JR.
Whittemore, Hulbert & Belknap
ATTORNEYS

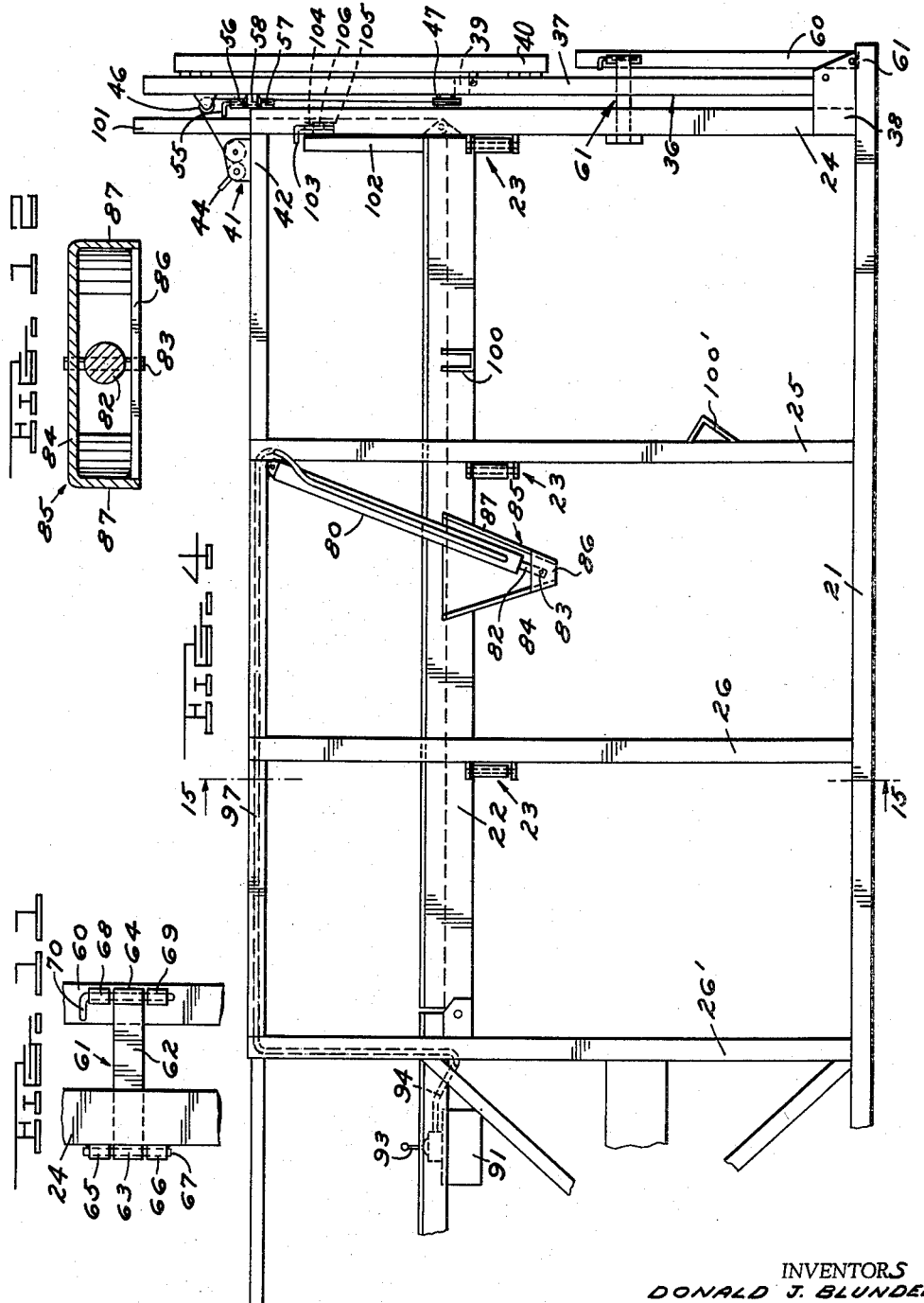

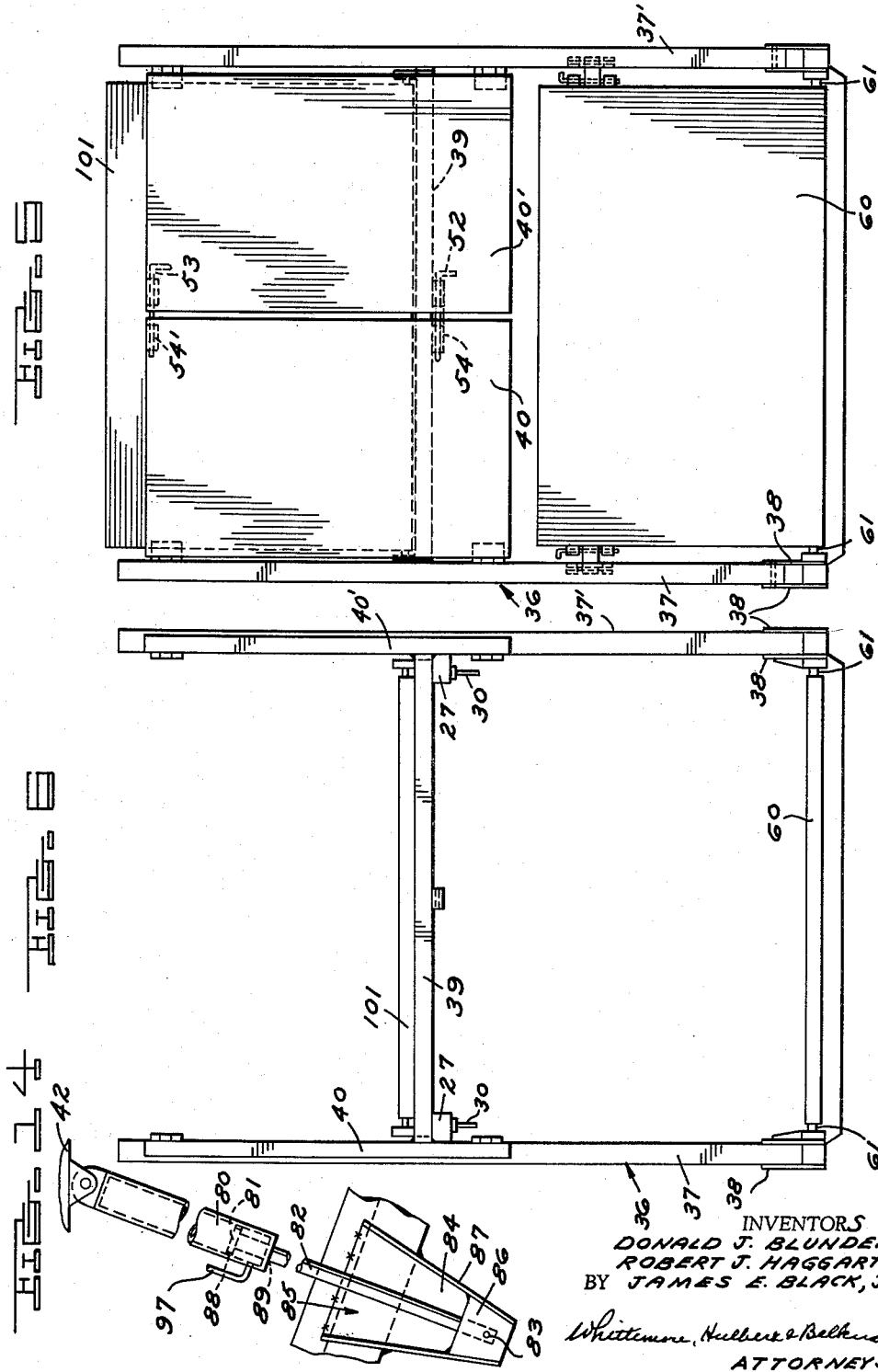

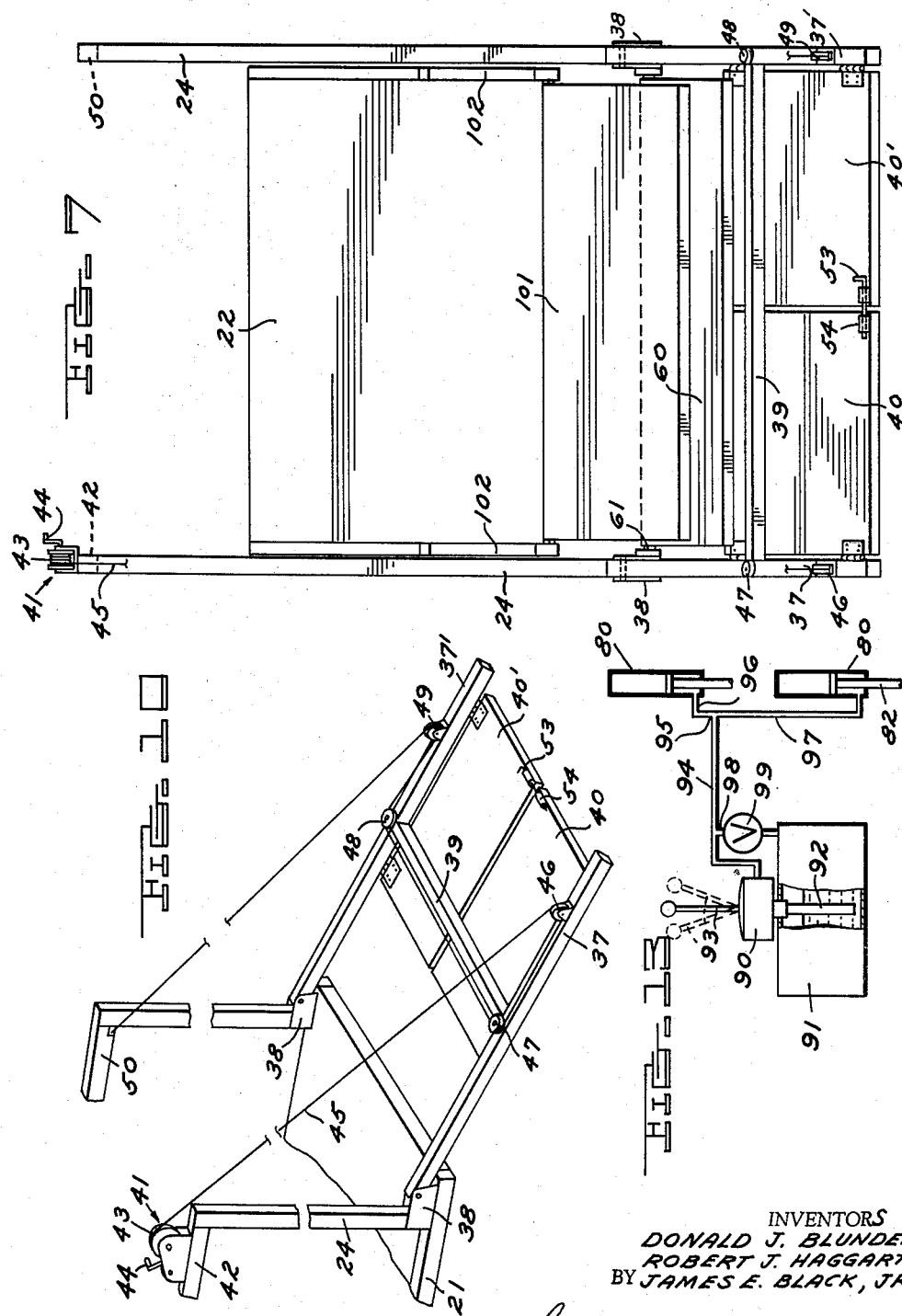

Jan. 7, 1964 D. J. BLUNDEN ETAL 3,116,844
VEHICLE TRANSPORT LOADING AND UNLOADING STRUCTURE
Filed March 19, 1962 7 Sheets-Sheet 6
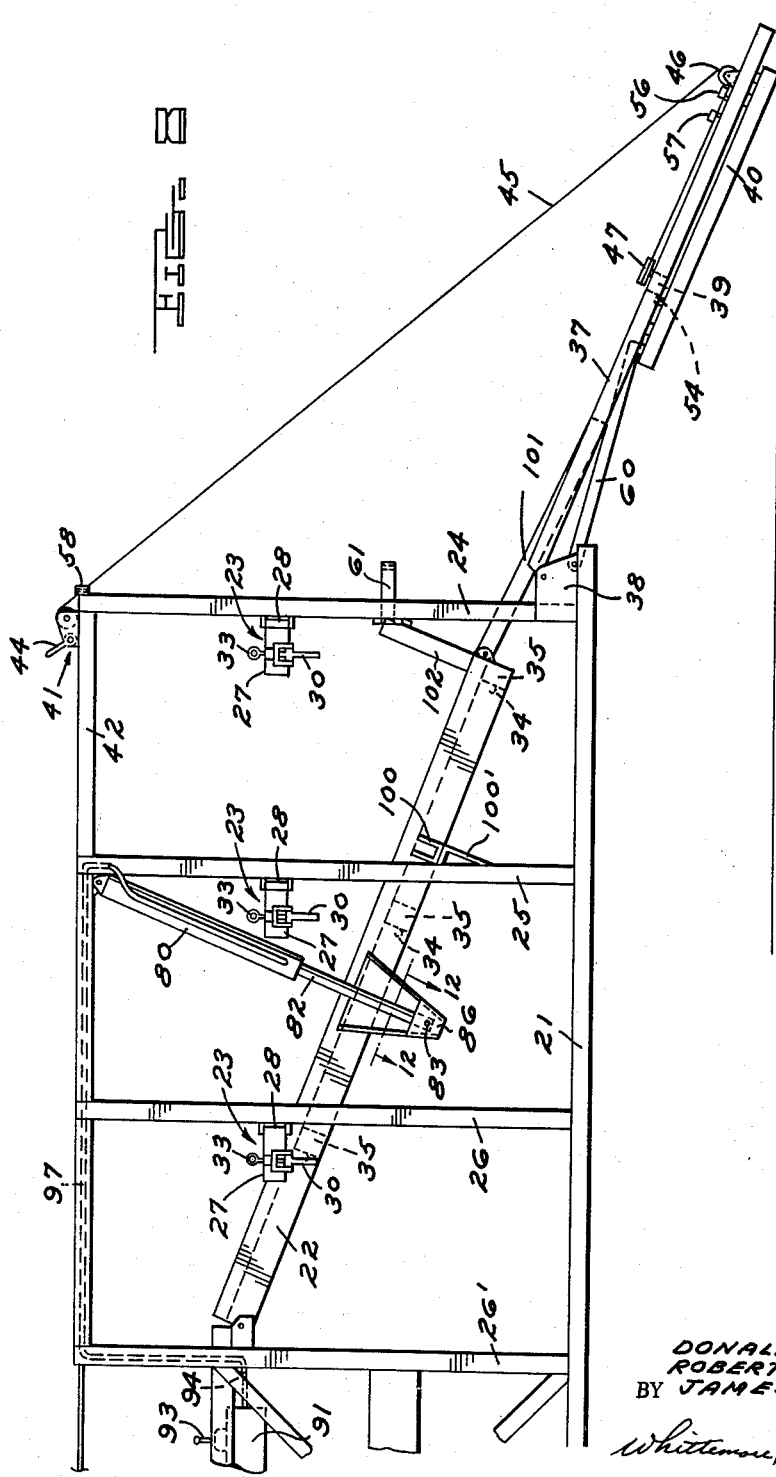
INVENTORS
DONALD J. BLUNDEN
ROBERT J. HAGGARTY
BY JAMES E. BLACK, JR.
Whittemore, Hulbert & Belknap
ATTORNEYS

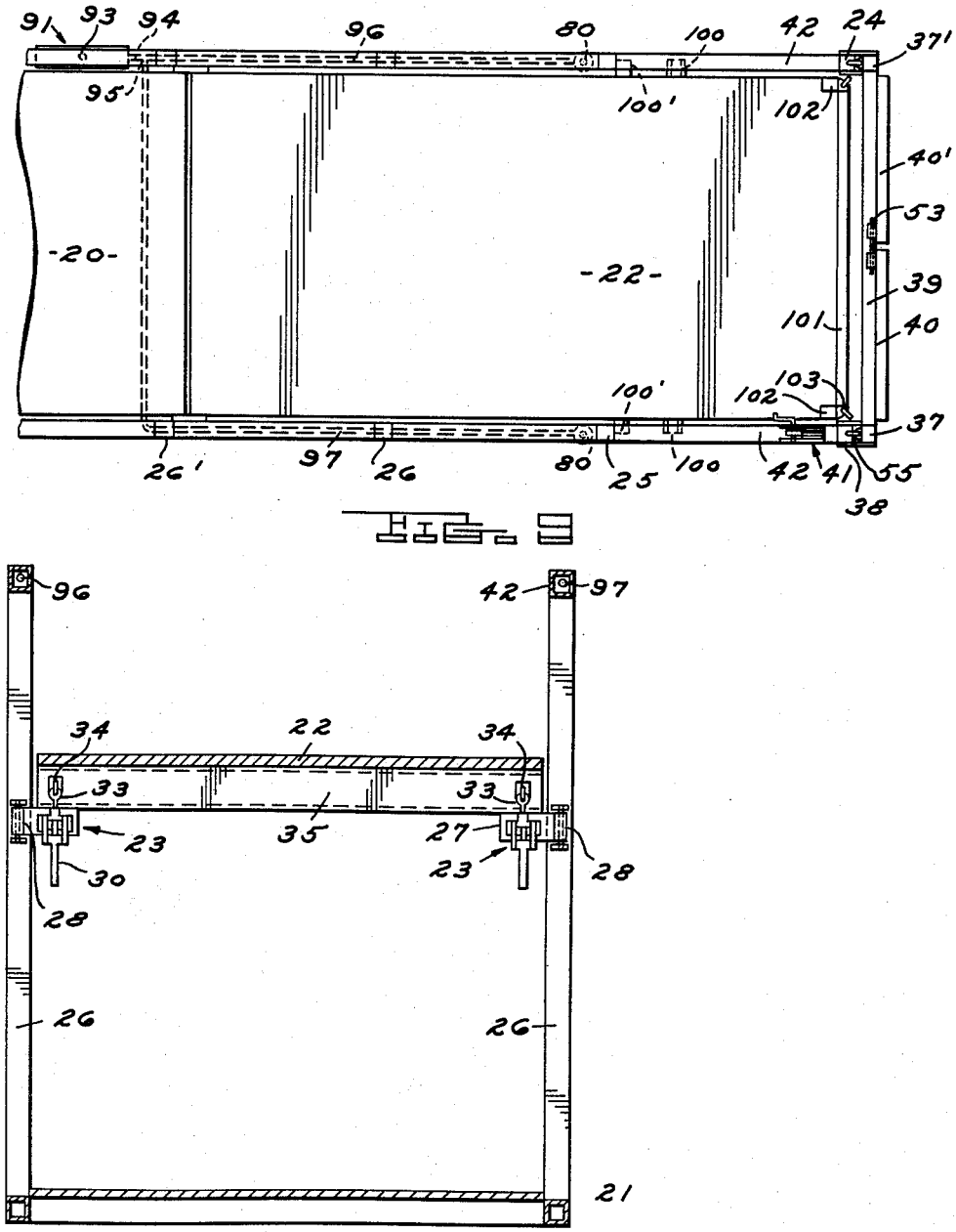

United States Patent Office 3,116,844
Patented Jan. 7, 1964

3,116,844
VEHICLE TRANSPORT LOADING AND
UNLOADING STRUCTURE
Donald J. Blunden, Detroit, Robert J. Haggarty, Trenton, and James E. Black, Jr., Lincoln Park, Mich., assignors to Whitehead & Kales Company, River Rouge, Mich., a corporation of Michigan
Filed Mar. 19, 1962, Ser. No. 180,449
10 Claims. (Cl. 214—85)

This invention relates generally to vehicle transport loading and unloading structures, and refers more particularly to an improved means for loading and unloading vehicles from the rear ends of the upper and lower decks of the vehicle transport.

One of the essential objects of the invention is to provide the lower fixed deck of the vehicle transport with a ramp having parallel side posts pivotally connected to the rear posts of the vehicle transport adjacent the lower ends thereof, a crossbar extending between and connected to said side posts, and two normally connected swing gates pivotally connected at their outer edges to said side posts.

Another object is to provide a ramp of the type just mentioned that is adapted to move from an inoperative position extending upwardly at the rear ends of the upper and lower decks to an operative downwardly inclined position upon the ground.

Another object is to provide a ramp of the type just mentioned in which the two normally connected swing gates may be disconnected from one another when said ramp is in an inoperative upright position and may be swung outwardly to fully open positions substantially in alignment with opposite side walls of the vehicle transport.

Another object is to provide the lower deck of the vehicle transport with a bridge plate that is pivotally connected at opposite side edges thereof to the side posts of the ramp, and is adapted to swing from an inoperative upright position at the rear end of the lower deck to a lowered operative position upon the swing gates of the ramp for the lower deck when said ramp is in an operative downwardly inclined position upon the ground, whereby vehicles may be driven over said swing gates and bridge plate while being loaded onto or unloaded from the lower deck of the vehicle transport.

Another object is to provide the upper fixed deck of the vehicle transport with a pivotally mounted rear section that is normally held in horizontal position in alignment with said fixed deck, and is capable of being lowered by suitable means to a downwardly inclined position substantially in alignment with the downwardly inclined position of the ramp for the lower deck.

Another object is to provide the pivotally mounted rear section of the upper deck with a bridge plate capable, when the swing gates of the lower ramp are in lowered downwardly inclined position, of being lowered from an inoperative upright position at the rear end of the upper deck to a downwardly inclined position constituting an endwise extension of the downwardly inclined pivotally mounted rear section of the upper deck, and is adapted to rest upon the lower bridge plate when the latter is in an operative position upon the lowered swing gates of the ramp for the lower deck, to enable vehicles to be loaded onto or unloaded from the upper deck of the vehicle transport.

Another object is to provide the upper deck with a bridge plate adapted, when the swing gates of the lower ramp are swung to fully open position, to be lowered from its inoperative upright position at the rear end of the upper deck of the vehicle transport to a horizontal position upon the upper deck of a second vehicle transport coupled to the first mentioned vehicle transport, to enable vehicles being transported to be driven over said bridge plate from one vehicle transport to the other.

Another object is to provide the lower deck with a bridge plate adapted, when the lower ramp is in an upright position, to be lowered from its inoperative upright position at the rear end of the lower deck of the vehicle transport through the space below the closed swing gates of said lower ramp to a horizontal position upon the lower deck of a second vehicle transport coupled to the first mentioned vehicle transport, to enable vehicles being transported to be driven over said bridge plate and beneath said closed swing gates from one vehicle transport to the other.

Another object is to provide a vehicle transport loading and unloading structure that is simple in construction, economical to manufacture, and efficient in use.

Other objects, advantages and novel details of construction of this invention will be made more apparent as this description proceeds, especially when considered in connection with the accompanying drawings wherein:

FIGURE 1 is a fragmentary elevational view of two coupled transport vehicles in position to receive vehicles from a loading dock.

FIGURE 2 is a fragmentary side elevation of the rear portion of one of the transport vehicles, and showing the lower ramp and lower bridge plate in downwardly inclined positions, to enable vehicles to be loaded onto or unloaded from the lower deck of the transport vehicle.

FIGURE 3 is a fragmentary side elevation of the rear portion of one of the transport vehicles, and showing the pivotally mounted rear section and bridge plate of the upper deck in lowered downwardly inclined position upon the downwardly inclined ramp and bridge plate of the lower deck, to enable vehicles to be loaded onto or unloaded from the upper deck of the transport vehicle.

FIGURE 4 is an enlarged fragmentary elevational view of the rear portion of a transport vehicle, and showing the lower ramp and the upper and lower bridge plates in upright locked position.

FIGURE 5 is a rear end view of the structure illustrated in FIGURE 4.

FIGURE 6 is a rear end view similar to FIGURE 5, but showing the rear end of the vehicle transport open, with the pivotally mounted rear section of the upper deck in raised position, and the upper and lower bridge plates in horizontal positions to rest upon the upper and lower decks of a second vehicle transport.

FIGURE 7 is a rear end view similar to FIGURE 6 and showing the pivotally mounted rear section and bridge plate of the upper deck in lowered downwardly inclined position upon the downwardly inclined ramp and bridge plate of the lower deck, to enable vehicles to be loaded onto or unloaded from the upper deck of the transport vehicle.

FIGURE 8 is a fragmentary enlarged elevational view of the rear portion of one of the transport vehicles, and showing the pivotally mounted rear section and bridge plate of the upper deck in lowered downwardly inclined position upon the downwardly inclined ramp and bridge plate of the lower deck, to enable vehicles to be loaded onto or unloaded from the upper deck of the transport vehicle.

FIGURE 9 is a top plan view of the structure shown in FIGURE 4, and showing the arrangement of hydraulic conduits for the hydraulic cylinders.

FIGURE 10 is a fragmentary perspective view of the ramp for the lower deck in lowered position, and showing the arrangement of the cable and the winch employed to raise and lower such ramp.

FIGURE 11 is an enlarged fragmentary view of one of the swing locks for the lower bridge plate.

FIGURE 12 is a sectional view taken substantially on the line 12—12 of FIGURE 8.

FIGURE 13 is an enlarged elevational view of the hydraulic fluid reservoir and pump assembly, with parts of the reservoir broken away, and showing a portion of the hydraulic conduits.

FIGURE 14 is an enlarged elevational view of one of the hydraulic cylinders and piston rod, and showing the pivotal connection between the lower end of the piston rod and a bracket secured to a portion of the pivotally mounted rear section of the upper deck.

FIGURE 15 is a cross sectional view through the vehicle transport, and showing swing locks for holding the upper hinged deck in raised position.

FIGURE 16 is a detailed view of one of the swing locks in locked position.

FIGURE 17 is a view taken at substantially right angles to FIGURE 16.

FIGURE 18 is a view of one of the swing locks in partially open position.

Referring now to the drawings, 10 is a railway flat car having a flat deck 11 supported upon suitable trucks 12 provided with rail engaging wheels 13.

14 and 15 respectively are upright elongated racks mounted in substantially end-to-end relation upon the flat deck 11 of the flat car. The flat car 10 and upright elongated racks 14 and 15 collectively constitute a vehicle transport 15' for vehicles to be transported.

The forward rack 14 includes a pair of upright side frames 16 at opposite sides of the flat deck 11, and such side frames 16 are interconnected by upper and lower stationary vehicle carrying decks 17 and 18 respectively.

The upper and lower stationary decks 17 and 18 respectively of the rack 14 extend the full length of and slightly beyond the forward and rear ends of the side frames 16. Such upper and lower decks 17 and 18 extend from the forward end of the flat car 10 to points substantially midway the ends of said flat car. The rear rack 15 includes a pair of upright side frames 19 at opposite sides of the flat deck 11, and such side frames are interconnected by upper and lower stationary vehicle carrying decks 20 and 21 respectively. The lower stationary deck 21 of the rack 15 extends from a point adjacent the rear end of the lower deck 18 of the rack 14 to the rear end of said flat car 10, while the upper stationary deck 20 of the rack 15 extends from a point adjacent the rear end of the upper deck 17 of the rack 14 to a point terminating short of the rear end of the lower deck 21, and is pro-provided at its rear end with a pivotally mounted downwardly swinging rear deck section 22.

Normally the downwardly swinging rear deck section 22 is locked in raised horizontal position in alignment with the stationary upper deck 20 by means of six swing locks 23 pivotally mounted upon each of the rearmost three posts 24, 25 and 26 respectively at each side of the vehicle transport at the rear end thereof. Preferably the swing locks 23 are identical in construction, and each comprises a horizontally extending vertical plate 27 hinged at one end to a vertical pintle 28 carried by one of the posts mentioned, a yoke 29 fixed to one side of said plate, a lever 30 pivoted to said yoke, a yoke 31 pivoted to said lever 30 adjacent its pivot, and an eyebolt 32 extending endwise from the yoke 31 and having an eye 33 engageable with a hook 34 secured to a crossbar 35 on the underside of the rear deck section 22.

The operation of each of the six swing locks 23 is the same. Each pair of vertical plates 27 are movable from inoperative positions at opposite sides of the rack to operative positions beneath a crossbar 35 of the rear deck section 22, to support the latter. After the eyes 33 have been engaged with the adjacent hooks 34, the levers 30 are pulled downwardly to lock the deck section 22 in assembled position upon the upper edges of the vertical plates. After each of the six swing locks 23 has been moved to an operative position as aforesaid, the rear deck section 22 is locked in a horizontal position.

The lower fixed deck 21 of the vehicle transport is provided with a ramp 36 having parallel side posts 37 and 37' extending between and pivotally connected to parallel hinged plates 38 fixed to opposite sides of the rear posts 24 of the vehicle transport adjacent the lower ends thereof and normally extending in an upright position above said side frames, a crossbar 39 extending between and connected to said side posts 37 and 37' at approximately midway the ends thereof, and two normally connected swing gates 40 and 40' pivotally connected at their outer edges to said side posts. Such ramp 36 and swing gates 40 and 40' are movable as a unit from an inoperative upright position at the rear ends of the upper and lower decks 22 and 21 to an operative downwardly inclined position upon the ground.

The ramp 36 may be raised and lowered by a winch 41 mounted upon a horizontal side bar 42 secured to the upper ends of the four rear posts 24, 25, 26, and 26' respectively at one side of the rear rack 15. Such winch 41 has a rotatable drum 43 and an operating handle 44. A cable 45 is secured to and is wound upon the drum 43, and extends from the latter around a pulley 46 on the side post 37 of the ramp, thence around pulleys 47 and 48 respectively upon opposite ends of the crossbar 39, thence around a pulley 49 on the other side post 37' of the ramp, and is secured to a horizontal side bar 50 secured to the four rear posts 24, 25, 26, and 26' respectively at the other side of the vehicle transport.

The crossbar 39 between the side posts 37 and 37' of the ramp 36 is just below the elevation of the upper deck 20, to provide clearance for the vehicles being loaded onto and being unloaded from the lower deck 21. Such crossbar 39 cooperates with the side posts 37 and 37' to provide structural rigidity to the rear end of the framework of the rear rack.

The swing gates 40 and 40' are normally connected by L-shaped latch bolts 52 and 53 respectively engageable with keepers 54 and 54' fixed to said swing gates adjacent their upper and lower edges. Such swing gates 40 and 40' may be disconnected from one another when said ramp 36 is in an inoperative position, and may be swung outwardly to fully open position substantially in alignment with opposite side walls of the vehicle transport.

Two inverted L-shaped vertical pins 55 are employed to hold the ramp 36 in an upright inoperative position. As shown, each pin 55 extends vertically downwardly through upper and lower vertically aligned eyes 56 and 57 fixed to the side posts 37 and 37', and through an intermediate eye 58 fixed to the rear post 24 of the rear rack 15.

The lower rear fixed deck 21 of the vehicle transport is also provided with a bridge plate 60 that is pivotally connected at opposite side edges thereof adjacent one transverse edge to trunnions 61 fixed to the inner hinge plates 38 for the ramp, and is adapted to swing from an inoperative upright position at the rear end of the lower deck 21 to a lowered operative position upon the swing gates 40 and 40' on the ramp 36 for the lower deck, when said ramp is in an operative downwardly inclined position upon the ground, whereby vehicles may be driven over said swing gates 40 and 40' and bridge plate 60 while being loaded onto or unloaded from the lower deck of the vehicle transport.

Two swing locks 61 are employed at opposite side edges of the bridge plate 60 to hold the same in an inoperative upright position. As shown, each swing lock 61 has a horizontal arm 62 provided at opposite ends with vertical eyes 63 and 64 respectively. The vertical eye 63 is between and in vertical alignment with upper and lower vertically aligned eyes 65 and 66 respectively fastened to the post 24, and is sleeved on a vertical hinge pin 67 extending through the aligned eyes 63, 65 and 66, while the vertical eye 64 is between and in vertical alignment with upper and lower vertically aligned eyes 68 and 69 respectively fastened to opposite side edges of the bridge plate, and is sleeved on a removable vertical pin 70 extending through the aligned eyes 64, 68 and 69.

The downwardly swinging deck section 22 of the upper deck is power operated, and is raised and lowered when the swing locks 61 are in an inoperative position. Preferably two hydraulic cylinders 80 are provided upon opposite side frames 19 of the rack. Each of said cylinders 80 is connected at its upper end to the upper end of the post 25 of each side frame 19 and contains a piston 81 provided with a piston rod 82 extending outwardly through the lower end of the cylinder. The lower end of each piston rod 82 is connected to a pin 83 extending between the base 84 of a channel-shaped bracket 85 and a plate 86 welded to the side flanges 87 of said bracket at the lower end thereof. The base 84 of each channel-shaped bracket 85 is welded to the swinging deck section 22 at one side edge thereof. Suitable seals 88 and 89 respectively are provided between the piston 81 and cylinder 80 and between the latter and the piston rod 82.

Located rearwardly of the cylinders 80, preferably upon one side of the stationary upper deck 20 is a pump 90 and reservoir 91 assembly. The reservoir 91 contains a suitable hydraulic fluid, and the pump 90 is mounted upon said reservoir and has a tube 92 extending downwardly into the hydraulic fluid in the reservoir. The pump 90 is also provided with a suitable operating handle 93. The main conduit 94 leads from the pump 90 to a T-shaped fitting 95 from which two branch conduits 96 and 97 respectively extend to the two hydraulic cylinders 80 on the side frames 19 of the rack. A branch conduit 98 extends from the conduit 94 at a point intermediate the pump 90 and T-shaped fitting 95 to the reservoir 91, and is provided with a valve 99.

In operation, the valve 99 is closed when the swinging deck section 22 is raised by operation of the handle 93 for the pump 90, and is opened when the swinging deck section 22 is lowered. The weight of the swinging deck section 22 moving downwardly causes fluid in the cylinders 80 and in the branch conduits 96 and 97 to return via the main conduit 94 and branch conduit 98 to the reservoir 91 when the valve 99 is opened. Preferably, the swinging deck section 22 is provided at opposite sides thereof with brackets 100 that are adapted to rest upon suitable V-shaped brackets 100' rigidly secured to the side posts 25 intermediate the ends thereof, when the swinging deck section 22 is lowered.

The pivotally mounted rear section 22 of the upper deck is provided with a bridge plate 101, capable when the swing gates 40 and 40' of the lower ramp 36 are in lowered downwardly inclined position, of being lowered from an inoperative upright position at the rear end of the upper deck to a downwardly inclined position substantially in alignment with and constituting an endwise extension of the downwardly inclined pivotally mounted rear section 22 of the upper deck. Such bridge plate 101 is adapted to rest upon the lower bridge plate 60 when the latter is in an operative position upon the lowered swing gates 40 and 40' of the ramp 37 for the lower deck, to enable vehicles to be loaded onto and unloaded from the upper deck 20 of the vehicle transport.

Upright posts 102 are rigidly secured to the pivotally mounted rear deck section 22 adjacent opposite side edges thereof, and the bridge plate 101 is secured to said posts by two vertical pins 103 that extend downwardly through upper and lower aligned eyes 104 and 105 secured to opposite side edges of the bridge plate 101 and through an intermediate eye 106 secured to each post 102.

When the vehicle transport 15' is coupled to a second vehicle transport 107 of similar construction, as shown in FIGURE 1, the bridge plate 101 at the rear end of the pivotally mounted rear deck section 22 of the upper deck is adapted, when the swing gates 40 and 40' of the lower ramp 36 are swung to fully open position, to be lowered from its inoperative upright position at the rear end of the upper deck 22 of the vehicle transport to a horizontal position upon the upper deck 108 of the second vehicle transport 107 to enable vehicles to be transported to be driven over said bridge plate 101 from one vehicle transport to the other.

Likewise, when the vehicle transport 15' is coupled to a second vehicle transport 107, the bridge plate 60 at the lower end of the lower deck 21 is adapted, when the lower ramp 36 is in an upright position, to be lowered from its inoperative upright position at the rear end of the lower deck 21 through the space below the closed swing gates 40 and 40' of said lower ramp 36 to a horizontal position upon the lower deck 109 of the second vehicle transport 107 to enable vehicles being transported to be driven over said bridge plate 60 and beneath said closed swing gates 40 and 40' from one vehicle transport to the other.

Preferably the vehicles to be transported are loaded onto the coupled vehicle transports 15' and 107 from a suitable loading dock 110 having two longitudinally spaced pairs of uprights 111 and 112, a ramp 113, and a bridge plate or skid 114 pivoted to the loading or outer end of the ramp 113.

When it is desired to load the lower decks 18 and 109 of the coupled vehicle transports, the ramp 113 and bridge plate 114 are supported by suitable crossbars (not shown) in a horizontal position on the two pairs of uprights 111 and 112, and the skid 114 is placed upon the lower deck 18 of the first vehicle transport 15', so that the vehicles to be loaded may be driven from the ground upon skids (not shown) onto the ramp 113 and thence over said ramp and skid 114 onto the lower deck 18 of the vehicle transport 15', and thence over the bridge plate 60 onto the lower deck 109 of the second vehicle transport 107.

When it is desired to load the upper decks 17 and 108 of the coupled vehicle transports, the ramp 113 is raised and is supported by suitable means (not shown) in an upwardly inclined position, and the skid 114 is placed upon the upper deck 17 of the first vehicle transport 15', so that vehicles to be loaded may be driven from the ground upon skids (not shown) onto the ramp 113, and thence over said ramp 113 and skid 114 onto the upper deck 17 of one vehicle transport 15' and thence over the bridge plate 101 onto the upper deck 108 of the second vehicle transport 107.

After the loading has been completed, the bridge plates 60 and 101 are then raised to upright position, and are held in such position by the swing lock 61 and pins 103. The swing gates 40 and 40' are then closed, and are held in closed position by the pins 52 and 53.

The vehicle transport 15' is primarily designed to transport farm tractors T, however such vehicle transport may transport vehicles of various types, and therefore is not limited to tractors.

What we claim as our invention is:

1. A vehicle transport having upright side frames, upper and lower vehicle carrying decks between and carried by said side frames, a ramp for the lower deck comprising two side posts pivoted at their lower ends to said side frames adjacent the lower edges thereof and normally extending in an upright position above said side frames, two normally connected swing gates pivotally connected at their outer side edges to said side posts at their outer free ends and normally extending upwardly above said side frames, and a bridge plate pivotally connected at opposite side edges thereof adjacent one transverse edge to said side frames adjacent the lower edges thereof and normally extending in an upright position below said swing gates, said ramp and swing gates being movable as a unit from said upright position to a downwardly inclined position upon the ground, and said bridge plate being movable from said upright position to a downwardly inclined position upon the swing gates of the ramp when the latter is upon the ground, whereby vehicles may be driven over said swing gates and bridge plate when being loaded onto or unloaded from the lower deck of the vehicle transport.

2. A vehicle transport having upright side frames, each side frame having an upright rear post, upper and lower vehicle carrying decks between and carried by said side frames, parallel hinge plates fixed to opposite sides of said rear posts of said side frames, a ramp for the lower deck comprising two side posts extending between and pivotally connected to said parallel hinge plates and normally extending in an upright position above said side frames, two normally connected swing gates pivotally connected at their outer side edges to said side posts at their outer free ends and normally extending upwardly above said side frames, and a bridge plate pivotally connected at opposite side edges thereof adjacent one transverse edge to trunnions fixed to the inner hinge plate for said ramp and normally extending in an upright position below said swing gates, said ramp and swing gates being movable as a unit from said upright position to a downwardly inclined position upon the ground, and said bridge plate being movable from said upright position to a downwardly inclined position upon the swing gates of the ramp when the latter is upon the ground, whereby vehicles may be driven over said swing gates and bridge plate when being loaded onto or unloaded from the lower deck of the vehicle transport.

3. A vehicle transport having upright side frames, each side frame having an upright rear post, upper and lower vehicle carrying decks between and carried by said side frames, a ramp for the lower deck comprising two side posts pivoted at their lower ends to said side frames adjacent the lower edges thereof and normally extending in an upright position above said side frames, means detachably connecting said side posts when in an upright position to said rear posts, two normally connected swing gates pivotally connected at their outer side edges to said side posts at their outer free ends and normally extending upwardly above said side frames, and a bridge plate pivotally connected at opposite side edges thereof adjacent one transverse edge to said side frames adjacent the lower edges thereof and normally extending in an upright position below said swing gates, and means detachably connecting said bridge plate when in an upright position to said rear posts.

4. A vehicle transport having upright side frames, stationary upper and lower vehicle carrying decks between and carried by said side frames, the upper stationary deck terminating short of the rear end of the lower deck and provided at its rear end with a hinged downwardly swinging deck section, means for detachably holding said hinged deck section in raised position in line with the stationary upper deck, a bridge plate pivotally connected to the rear end of said hinged deck section and normally extending upwardly above said side frames, a ramp for the lower deck comprising two side posts pivoted at their lower ends to said side frames adjacent the lower edges thereof and normally extending in an upright position above said side frames, two normally connected swing gates pivotally connected at their outer edges to said side posts at their outer free ends and normally extending upwardly above said side frames in rear of said bridge plate, and a second bridge plate pivotally connected at opposite side edges thereof adjacent one transverse edge to said side frames adjacent the lower edges thereof and normally extending in an upright position below said swing gates, said ramp and swing gates being movable as a unit from said upright position to a downwardly inclined position upon the ground, said second mentioned bridge plate being movable from said upright position to a downwardly inclined position upon the swing gates of the ramp when the latter is upon the ground, said deck section being movable from raised position to a downwardly inclined position when released by said holding means, and said first mentioned bridge plate being movable to a downwardly inclined position substantially in alignment with and constituting an endwise extension of said downwardly inclined deck section and adapted to rest upon the second mentioned bridge plate when the latter is upon the swing gates of said ramp.

5. A vehicle transport having upright side frames, each side frame having an upright rear post, stationary upper and lower vehicle carrying decks between and carried by said side frames, the upper stationary deck terminating short of the rear end of the lower deck and provided at its rear end with a hinged downwardly swinging deck section, means for detachably holding said hinged deck section in raised position in line with the stationary upper deck, a bridge plate pivotally connected to the rear end of said hinged deck section and normally extending upwardly above said side frames, upright posts secured to said deck section at opposite sides thereof, means detachably connecting said bridge plate to the last mentioned upright posts, a ramp for the lower deck comprising two side posts pivoted at their lower ends to said side frames adjacent the lower edges thereof and normally extending in an upright position above said side frames, means detachably connecting said side posts when in an upright position to the rear posts of said side frames, two normally connected swing gates pivotally connected at their outer edges to said side posts at their outer free ends and normally extending upwardly above said side frames in rear of said bridge plate, and a second bridge plate pivotally connected at opposite side edges thereof adjacent one transverse edge to said side frames adjacent the lower edges thereof and normally extending in an upright position below said swing gates, and means detachably connecting said second bridge plate when in an upright position to the rear posts of said side frames.

6. A vehicle transport having upright side frames, each side frame having an upright post, stationary upper and lower vehicle carrying decks between and carried by said side frames, the upper stationary deck terminating short of the rear end of the lower deck and provided at its rear end with a hinged downwardly swinging deck section, a bracket secured to each upright post intermediate the ends thereof, a bracket secured to each side edge of said deck section, means for detachably holding said hinged deck section in raised position in line with the stationary upper deck, a bridge plate pivotally connected to the rear end of said hinged deck section and normally extending upwardly above said side frames, a ramp for the lower deck comprising two side posts pivoted at their lower ends to said side frames adjacent the lower edges thereof and normally extending in an upright position above said side frames, two normally connected swing gates pivotally connected at their outer edges to said side posts at their outer free ends and normally extending upwardly above said side frames in rear of said bridge plate, a second bridge plate pivotally connected at opposite side edges thereof adjacent one transverse edge to said side frames adjacent the lower edges thereof and normally extending in an upright position below said swing gates, said ramp and swing gates being movable as a unit from said upright position to a downwardly inclined position upon the ground, said second mentioned bridge plate being movable from said upright position to a downwardly inclined position upon the swing gates of the ramp when the latter is upon the ground, said deck section when released by said holding means being movable from raised position to a downwardly inclined position so that the brackets at opposite edges of said deck section will rest upon the brackets upon said posts, and said first mentioned bridge plate being movable to a downwardly inclined position substantially in alignment with and constituting an endwise extension of said downwardly inclined deck section and adapted to rest upon the second mentioned bridge plate when the latter is upon the swing gates of said ramp, and hydraulic means for raising said hinged deck section so that the brackets secured to the side edges of said deck section will be raised from the brackets upon said posts and said hinged deck section will be raised to a horizontal position in line with the stationary upper deck.

7. A vehicle transport having upright side frames, each side frame having an upright rear post, a deck between and carried by said side frames, a bridge plate pivotally mounted adjacent said lower deck and normally extending in an upright position, and means for detachably holding said bridge plate in an upright position, including swing locks at opposite side edges of said bridge plate, each swing lock including vertically spaced eyes upon opposite side edges of said bridge plate, vertically spaced eyes upon each post, a horizontal arm provided at opposite ends thereof with eyes respectively between and in vertical alignment with the vertically spaced eyes aforesaid, a hinge pin extending through the vertically spaced eyes on said post, and a removable pin extending through the vertically spaced eyes upon opposite side edges of said bridge plate.

8. A vehicle transport having upright side frames, each side frame having a set of four longitudinally spaced upright posts at the rear end thereof, a horizontal side bar secured to the upper ends of each set of said upright posts, a deck between and carried by said side frames, a ramp for said deck comprising two side posts pivoted at their lower ends to said side frames adjacent the lower edges thereof and normally extending in an upright position at the rear end of said deck, a crossbar connected to said side posts intermediate opposite ends thereof, two normally connected swing gates pivotally connected at their outer side edges to said side posts at their outer free ends, a bridge plate pivotally connected at opposite sides thereof adjacent one transverse edge to said side frames adjacent the lower edges thereof and normally extending in an upright position below said swing gates, and means for lowering and raising said ramp and swing gates as a unit, including a winch mounted upon one of said horizontal side bars and provided with a rotatable drum and an operating handle, pulleys on said side posts, a pair of pulleys on said crossbar at opposite ends thereof, and a cable wound upon said drum, extending around one of the pulleys on said side posts, thence around the pair of pulleys on said crossbar, thence around the pulley on the other of said side posts, and terminally secured to the other of said side bars.

9. A vehicle transport having upright side frames, upper and lower vehicle carrying decks between and carried by said side frames, the upper stationary deck terminating short of the rear end of the lower deck and provided at its rear end with a hinged downwardly swinging deck section, means for detachably holding said hinged deck section in raised position in line with the stationary upper deck, a bridge plate pivotally connected to the rear end of said hinged deck section and normally extending upwardly above said side frames, a ramp for the lower deck comprising two side posts pivoted at their lower ends to said side frames adjacent the lower edges thereof and normally extending in an upright position above said side frames, two swing gates pivotally connected at their outer side edges to said side posts at the outer free ends thereof, said swing gates being normally connected to each other at their inner side edges and normally extending upwardly above said side frames, and a second bridge plate pivotally connected at opposite side edges thereof adjacent one transverse edge to said side frames adjacent the lower edges thereof and normally extending in an upright position below said swing gates, said swing gates when disconnected from each other being movable outwardly to fully open positions substantially in line with the upright side frames, and said first and second mentioned bridge plates being adapted, when said ramp is in an upright position, and said swing gates are in fully open positions, to be moved outwardly to horizontal positions respectively upon upper and lower supports therefor to enable vehicles to be driven over said bridge plates to and from said upper and lower decks.

10. A vehicle transport having upright side frames, upper and lower vehicle carrying decks between and carried by said side frames, a ramp for the lower deck comprising two side posts pivoted at their lower ends to said side frames adjacent the lower edges thereof and normally extending in an upright position above said side frames, two swing gate pivotally connected at their outer side edges to said side posts at the outer free ends thereof, said swing gates being normally connected to each other at their inner side edges and normally extending upwardly above said side frames, and a bridge plate pivotally connected at opposite side edges thereof adjacent one transverse edge to said side frames adjacent the lower edges thereof and normally extending in an upright position in a space below said swing gates, said bridge plate being adapted, when said ramp is in an upright position, to be moved outwardly through the space below said swing gates to a horizontal position upon a support therefor to enable vehicles to be driven over said bridge plate and beneath said swing gates to and from said lower deck.

References Cited in the file of this patent

UNITED STATES PATENTS

| 1,207,266 | Bartholomew | Dec. 5, 1916 |
| 2,183,834 | Ferris | Dec. 19, 1939 |
| 2,432,228 | De Lano | Dec. 9, 1947 |
| 2,473,830 | Stuart | June 21, 1949 |

FOREIGN PATENTS

| 402,554 | Great Britain | Dec. 7, 1933 |